Dec. 20, 1949  G. E. KING ET AL  2,491,984
AMPLIFYING PLURAL-STAGE DYNAMO
Filed July 17, 1947  2 Sheets-Sheet 1

WITNESSES:
Robert C. Baird
Wm. L. Groome

INVENTORS
George E. King and
Martin H. Fisher.
BY C. M. Avery
ATTORNEY

Dec. 20, 1949  G. E. KING ET AL  2,491,984
AMPLIFYING PLURAL-STAGE DYNAMO
Filed July 17, 1947  2 Sheets-Sheet 2
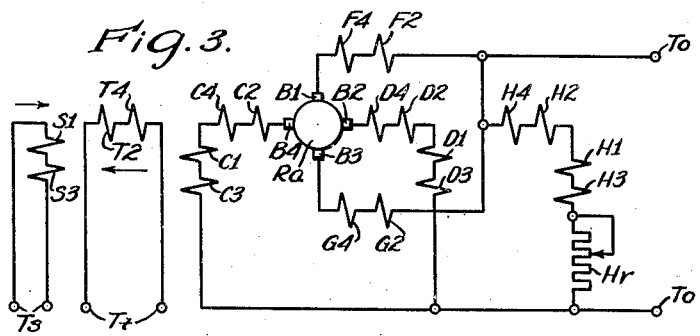
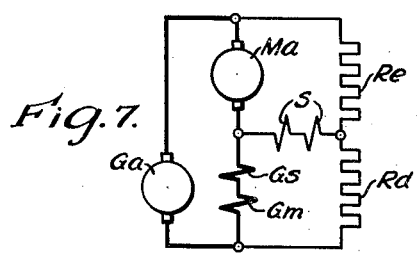
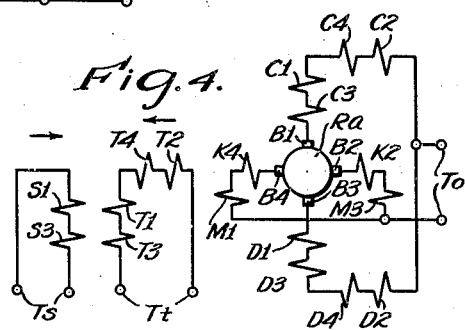
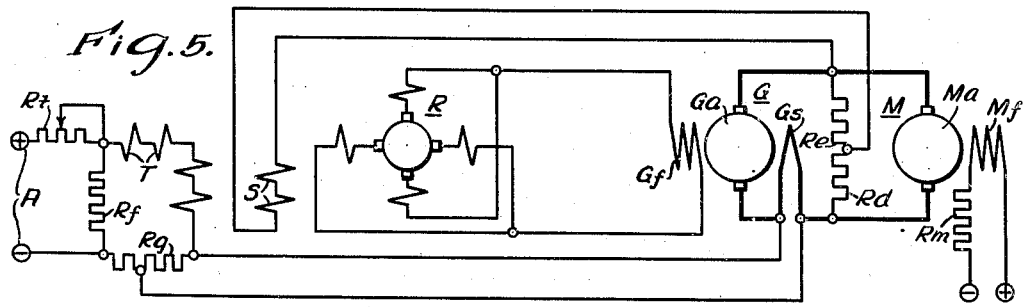
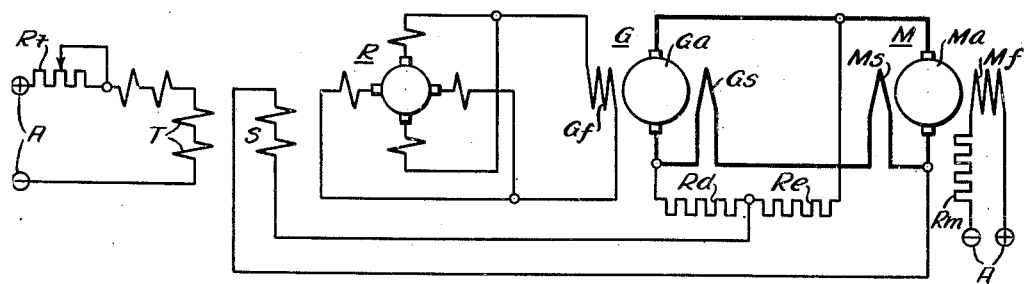
INVENTORS
George E. King and
Martin H. Fisher.

Patented Dec. 20, 1949

2,491,984

UNITED STATES PATENT OFFICE 2,491,984

AMPLIFYING PLURAL-STAGE DYNAMO

George E. King and Martin H. Fisher, Pittsburgh, Pa., assignors to Westinghouse Electric Corporation, East Pittsburgh, Pa., a corporation of Pennsylvania Application July 17, 1947, Serial No. 761,556

10 Claims. (Cl. 322—92)

Our invention relates to direct-current dynamos of the plural-stage amplifying type. Such dynamos, as understood in this specification as well as in the appertaining claims, operate normally along the unsaturated and substantially linear portion of their magnetization characteristic and are equipped with at least one field excitation circuit energized by internal circulating current which flows between commutator brushes and is substantially independent of the external load current of the dynamo. Dynamos of this type are disclosed, for instance, in the copending applications, all assigned to the assignee of the present invention, Serial No. 607,440, now Patent 2,484,835, issued October 18, 1949, Serial No. 682,188, now Patent 2,484,840, issued October 18, 1949, Serial No. 685,109, now Patent 2,445,788, and Serial No. 696,575.

It is an object of our invention to provide amplifying plural-stage dynamos that lend themselves, more readily than those heretofore known and proposed, to being controlled by two or more extraneous signal or control voltages of widely divergent magnitudes, or to responding to two or more control intelligences with widely different time constants or speeds of response. More particularly, our invention aims at designing amplifying dynamos which, while permitting the application of two or more control voltages of greatly different magnitudes, afford a saving in coil space or an improved utilization of available coil space or a reduction in the amount of necessary accessories such as potentiometric rheostats or other voltage-adapting equipment.

In order to achieve these objects, and in accordance with our invention we provide an amplifying plural-stage dynamo with a plurality of externally energized signal or control field windings and arrange these windings in different amplifying stages of the machine, so that the performance of the dynamo depends upon the resultant effect of control intelligences impressed on the respective circuits of different amplifying stages. According to one of the more specific features of our invention, we dispose and energize the different stage-control fields so that their effects are cumulative as regards the resultant control of the machine performance. According to another feature, we devise the dynamo so as to obtain a differential, for instance balanceable, effect of the different-stage control fields. According to another feature of the invention, we design one or several of the controls in such a manner that they impart an unbalance or distortion of controlled degree upon the multi-pole flux distribution of the dynamo, while one or several other control fields are symmetrically effective to vary the magnitude of a symmetrical and balanced flux distribution.

These and other objects and features of the invention will be understood from the following explanation and from the description, given below, of the embodiments illustrated in the drawings, in which:

Fig. 3 shows a simplified circuit diagram of a modified triple-stage generator;

Fig. 4 is the circuit diagram of an amplifying double-stage generator;

Figs. 5 and 6 are circuit diagrams of two variable voltage drives applicable in conjunction with any of the plural-stage generators according to the preceding figures; and Fig. 7 is explanatory and shows separately one of the circuits embodied in the system of Fig. 6.

Figure 1:
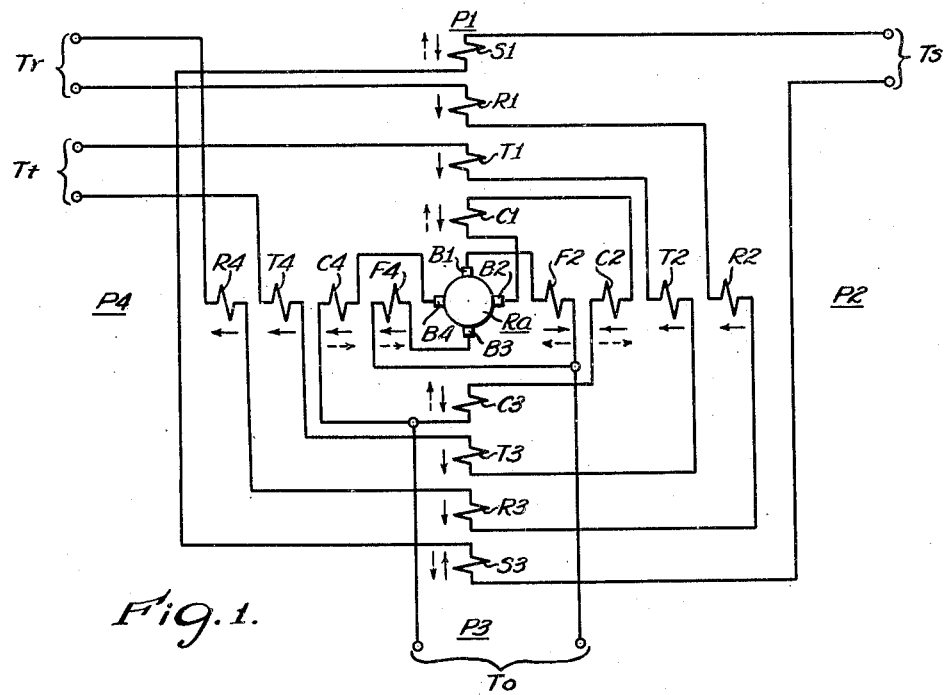
Figure 1 shows schematically a circuit diagram of an amplifying triple-stage generator with emphasis on the mutual magnetic relation of the appertaining field windings.

The invention, as embodied in the illustrated examples, will be more readily understood if the following features, common to the above-mentioned known or previously proposed plural-stage dynamos, are kept in mind. Amplifying plural-stage dynamos may be considered to represent two or more "machines" which operate in cascade connection and are magnetically superimposed upon one another to form a single electromagnetic unit. The first "machine" or input stage of such a dynamo, referring to the case of a generator, is represented by input field windings which are energized by control or signal excitation and cause an internal circulating current to flow between an equalizing brush connection of the machine. This circulating current is used to excite the field of the second "machine" or amplifying stage either by means of field coils (forcing coils) or by armature reaction excitation, and the output voltage of the second stage appears across the commutator brushes correlated to the field of the second stage. If the dynamo has only two amplifying stages, the latter voltage is the output voltage of the whole unit. If more than two stages are provided, the latter voltage is used to excite the field of the third stage and so on. In these plural-stage dynamos, only the control field coil or coils in the input circuit of the first amplifying stage are excited by variable or adjustable control intelligence supplied from the outside of the machine, while the field of the second or of any additional stage is internally excited by circulating currents set up within the machine circuits.

It has been proposed, as apparent from the above-mentioned copending applications, to provide the machine with self-excitation in addition to the above-mentioned amplifying cascade excitation. To this end, the machine is equipped with field coils which receive part or all of their excitation from the output or load energy of the dynamo and to this end are series, parallel or compound connected relative to the external load circuit of the machine. Such self-energizing field windings, especially if the resistance line of the field circuit is "tuned" to the unsaturated linear portion of the no-load magnetization characteristic or air gap line of the machine, do not provide a variable control intelligence and, since they owe their excitation to the voltage of the last amplifying stage, may also be considered to be internally excited. Hence, in the known and previously proposed self-excited machines, all externally energizable control field windings are also arranged in the input circuit of the first amplifying stage only.

In contrast thereto, and as briefly stated above, the invention requires that a plurality of externally energizable signal or control field windings be disposed in different amplifying stages of the dynamo. That is, according to our invention for instance, one signal or control field, to be energized by variable or adjustable separate excitation, is associated with the input stage, and another control field, also energized by variable or adjustable separate excitation, is associated with the second stage of a double-stage dynamo, or either with the intermediate stage or the third stage of a triple dynamo. Since such a machine involves an amplification ratio, for instance of about 1:100, between adjacent stages, the different control voltages in order to have substantially equivalent effects may have a different order of magnitude. It follows, that with such a machine control intelligences or voltages of widely divergent magnitudes can immediately be applied to the control fields of the machine. This affords considerable advantages in cases where the generator forms part of a control system in which the occurrence of such divergent voltage magnitudes is inevitable or desirable.

The known and previously proposed plural-stage dynamos are, of course, also capable of operating under control by voltages of greatly different magnitudes. However, it is then necessary to resort to one or both of the following two expedients. First, the field coils which are to respond to widely different voltages and are disposed only in the input stage of the generator can be given correspondingly different numbers of turns. However, since dynamos of the type here involved require a relatively large number of field coils, the available coil space is limited so that the just-mentioned measure is applicable only to a very limited extent unless the dimensions of the machine are unfavorably increased. The second expedient, available with the known and previously disclosed plural-stage dynamos, for applying control voltages of greatly different magnitudes consists in providing external potentiometric or other translating means which, for instance, reduce the higher voltages to a magnitude of about the same order as that of the lowest voltage. This, however, requires additional voltage-adapting equipment and has the effect that only a small portion of one or several of the control voltages is actually used for control purposes. Furthermore, additional time constants or delays may thus be introduced to the detriment of accuracy of control and speed of response of the amplifying machine. It will therefore be understood that in cases of application of the type here considered, the present invention affords a saving in coil space or overall space of the dynamo, a reduction in the amount of additional equipment, an improvement in performance or a combination of several such advantages.

When according to our invention a plurality of control voltages are applied to different cascades or stages of amplification, the time constants of the response of the dynamo to the respective control intelligences are different. That is, a control voltage applied to the input stage produces a corresponding change in performance more quickly than a control intelligence applied to the control of the last stage of the dynamo. Consequently, the invention permits also a selective differentiation between the speeds with which the various control intelligences are to enforce a change in dynamo performance; and this possibility may be used to advantage even if the above-mentioned divergence in the order of voltage magnitude is less essential or not taken advantage of.

The invention involves still another difference in control performance as compared with the plural-stage dynamos heretofore known and proposed. As mentioned above, a plural-stage dynamo may be considered to consist of several superimposed "machines" which are distinguished from one another either by a different number of field poles or by a different angular position of the pole axes. As a rule, the last amplifying stage of the dynamo includes all field poles and has at least two pole axes extending at a right angle to each other. The first-stage "machine," as a rule, has only two poles whose axis coincides with one of the two just-mentioned axes of the last-stage "machine." In consequence, when according to the present invention two or more externally energizable control coils are arranged in different amplifying stages, one of these control coils must be disposed on the field pole structure in such a manner that it appertains only to the two-pole "machine" which forms the input stage, while at least one other control coil is differently located on the field pole structure, for instance, so that it appertains to the all-pole or four-pole "machine" of the output stage. Referring, for instance, to a double-stage four-pole generator with two control field windings according to the invention, one of the control windings is disposed so that it induces only two field poles in the machine in one of the two pole axes, and the other control field winding is located on all four poles so that it provides a symmetrical field excitation relative to the entire field pole structure. In the just-mentioned example, the second control field coil has the effect of providing a field flux of symmetrical or balanced flux distribution while the first-mentioned field control field coil has the effect of imposing an asymmetry or unbalance of controlled degree upon the field excitation.

The amplifying generator illustrated in Fig. 1 has three cascade-connected amplifying stages. The field pole structure and armature of the machine are not illustrated because their shape and general design need not be different from that of ordinary four-pole machine. That is, the field structure has four main poles and four interpoles, and the armature is provided with a lap wound four-pole winding similar to that of conventional four-pole machines. In Fig. 1 the four field poles are located at P1, P2, P3 and P4 and the two corresponding pole axes are P1—P3 and P2—P4. The armature of the machine is represented by its commutator Ra, and the appertaining four contact brushes are denoted by B1, B2, B3 and B4.

The machine has field windings S1, R1, T1, C1 arranged on field pole P1, windings R2, T2, C2, F2 on field pole P2, windings S3, R3, T3, C3 on field pole P3, and windings R4, T4, C4 and F4 on field pole P4. The interpoles and appertaining commutating windings are not illustrated because their arrangement and design is not essential to the present invention and is fully apparent from the above-mentioned copending applications. The arrows shown in Fig. 1 adjacent to the respective field windings serve merely to indicate the mutual directional relation of the appertaining flux components as regards each of the pole axes P1—P3 and P2—P4, but these arrows correspond to an arbitrarily selected case of operation and are not intended to be quantitative. The broken arrows next to some coils indicate reversability of the flux direction dependent upon the polarity of a variable signal voltage referred to hereinafter.

The input circuit of the first amplifying stage extends between the two terminals Ts and includes the field windings S1 and S3. These field windings are magnetically associated with poles P1 and P3 and produce respective fields of opposing polarities so that, for instance, the pole P1 becomes a north pole and the pole P3 a south pole due to the signal excitation applied to coils S1 and S3. This (first component) flux causes the armature to impose a voltage difference between the brushes B1 and B2. Assuming that the armature rotates clockwise, brush B1 becomes negative and brush B2 positive relative to the two-pole flux of coils S1 and S3. Connected across brushes B1 and B3 is an internal circuit which includes the intermediate forcing coils F2 and F4. The internal circulating or equalizing current between brushes B1 and B3 causes the intermediate forcing coils to produce a second component flux in the axis P2—P4 which produces a voltage difference between brushes B2 and B4. Connected across brushes B2 and B4 are the main forcing coils C1, C2, C3 and C4. These coils produce in all four poles a third component flux of symmetrical and balanced distribution. Consequently, relative to the just-mentioned symmetrical flux component, the brushes B1 and B3 are equipotential and negative while the brushes B2 and B4 are equipotential and positive. The voltage difference produced between the brush pairs B1—B3 and B2—B4 due to the symmetrical component flux is applied to the output terminals To of the machine and represents the amplified, externally effective output voltage.

Reviewing the foregoing, it will be recognized that the first amplifying stage of the dynamo is excited by the signal coils S1 and S3 and has its output voltage appear across brushes B1 and B2. The input elements of the second stage are represented by the intermediate forcing coils F2 and F4 and produce a corresponding amplified output voltage across brushes B2 and B4. The last stage is input excited by the main forcing coils C1, C2, C3, C4 and produces an output voltage between the two brush pairs. The first and second stage of this triple amplifier represent two superimposed two-pole "machines" whose respective pole axes P1—P3 and P2—P4 extend at a right angle to each other, while the third stage represents a four-pole "machine" which is superimposed upon the above-mentioned two two-pole "machines" so that it includes both two-pole "machines."

Aside from the above-mentioned amplifying functions, the performance of the machine involves also armature reaction effects which, as in any generator, must be compensated or otherwise rendered ineffective in order to obtain optimum results. Auxiliary field windings applicable for the purpose of such a compensation will be referred to in the following description of Fig. 2. It may be mentioned, however, that these auxiliary windings may be designed in accordance with the disclosure in the above-mentioned copending application and do not involve novel or essential features as regards the present invention proper.

As far as described, the dynamo according to Fig. 1 is not different from those previously proposed. It will be recognized, however, that the illustrated machine is also equipped with two groups of externally energizable field windings which are both located on all four field poles. The coils of one of these groups are denoted by R1, R2, R3 and R4. These coils are connected across external terminals Tr to be excited by a variable control voltage. The coils of the other group are denoted by T1, T2, T3 and T4; they are connected to another pair of external terminals Tt to be excited by another variable control voltage. The coils R1, R2, R3 and R4 have equal numbers of turns relative to one another and, when energized, produce a symmetrical or balanced four-pole flux. The windings T1, T2, T3 and T4 have also equal numbers of turns, relative to one another, and are also disposed to produce a balanced four-pole flux.

Figure 2:
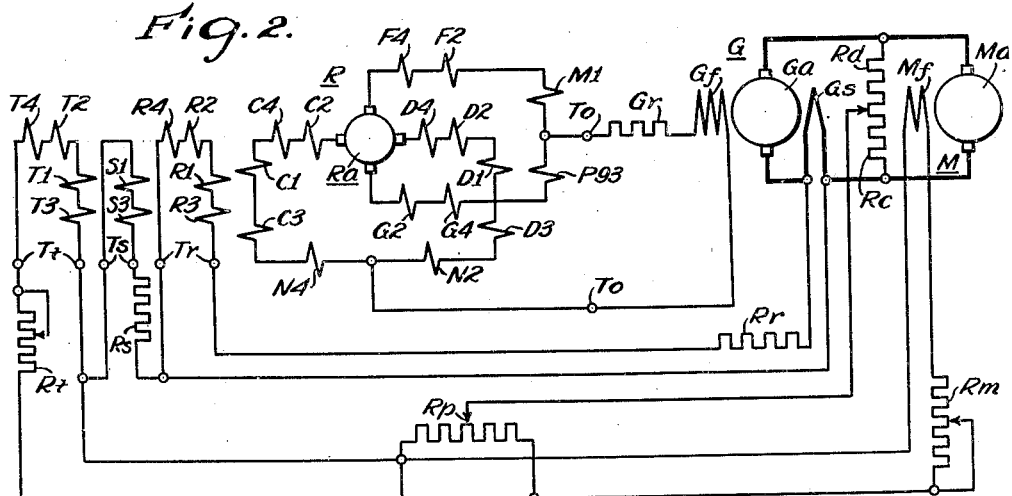
Fig. 2 shows the same generator in conjunction with a variable voltage drive controlled thereby, the amplifying generator being represented more in detail as to the number of its essential field windings but represented with emphasis on its electric circuits rather than the magnetic interrelation of the field windings.

The performance of the machine shown in Fig. 1 will best be understood from a concrete example of application. Such an example is schematically illustrated in Fig. 2. The amplifying dynamo according to Fig. 1 is shown at R in the left-hand portion of Fig. 2 by a representation of its electric circuits, except that the number and electric arrangement of the internally excited forcing coils is shown more in detail than in Fig. 1. The right-hand portion of Fig. 2 represents a variable voltage drive which comprises a main generator G and a variable speed motor M.

The amplifying dynamo R, as shown in Fig. 2, contains more field windings in its two internal equalizing circuits than are shown in Fig. 1. In the field circuit of the intermediate stage two intermediate forcing coils G2 and G4 are series-connected to the above-mentioned coils F2 and F4. The coils F2 and G2 on pole P2 are connected to be cumulative as regards the internal circulating current flowing between the brushes B1 and B3. However, relative to the load current which flows between the output terminals To of the dynamo, the two intermediate forcing coils F2 and G2 act differentially and balance each other so that the load current has no effect on the resultant field excitation of the second amplifying stage. The field coils F4 and G4 are similarly designed to operate cumulatively as regards the circulating current between brushes B1 and B3 but differentially with respect to the load current between the output terminals To of the machine.

According to Fig. 2 the field circuit of the last amplifying stage contains coils D1, D2, D3, D4 in addition to the coils C1, C2, C3 and C4 above mentioned. Coils C1 and D1 are both located on pole P1 to act cumulatively under the circulating current between brushes B2 and B4 but differentially with respect to the load current that flows through the output terminals To. In a similar manner the forcing coils C2 and D3 on pole P2 are cumulative under circulating current and differential under load current, and the coil pairs C3, D3, and C4, D4 have similar performance.

Shown in Fig. 2 are two pairs of auxiliary coils denoted M1, M3 and N2, N4. These coils serve to oppose or compensate the effects of detrimental armature reaction in accordance with the disclosure in the above-mentioned copending applications, Serial No. 607,440 and Serial No. 682,188. Since the present invention does not involve any change as regards such opposition and compensating coils, no further description is necessary except that it should be understood that each pair of these auxiliary coils is balanced relative to the load current in the same manner as mentioned above with reference to the intermediate and main forcing coils. Consequently, the amplifying performance of the machine, including the effects of the auxiliary windings, is independent of changes in load current or output voltage and is controlled only by the three externally energizable coil groups S1, S3, and R1, R2, R3, R4, and T1, T2, T3, T4.

According to Fig. 2, the externally energizable field coils T1, T2, T3 and T4 are connected through an adjusting rheostat Rt to the positive and negative terminals Ap and An of a suitable source of substantially constant direct-current voltage. This source may consist of an exciter (not shown) which is driven together with the armature Ra of the amplifying dynamo R and together with the armature Ga of the main generator. The output terminals To of the amplifying dynamo R are connected to the field winding Gf of the main generator B in series with a resistor Gr. The generator has also an interpole or compensating field winding Gs connected in series relation to the armature Ga and the armature Ma of the motor M. The motor field winding Mf is energized from the above-mentioned constant-voltage terminals Ap and An through an adjusting resistor Rm.

The function of the amplifying dynamo R in the system shown in Fig. 2 is to regulate the motor voltage impressed on the armature Ma of M so that the motor speed is maintained at a value determined by the selected setting of rheostat Rt in the circuit of the field coils T1 to T4. In view of this function, these field coils are hereinafter referred to as "pattern" field coils. The field windings S1 and S3, hereinafter called "signal" or "pilot" field coils are connected in series with a calibrating resistor Rs across a tapped-off portion of a voltage-dividing resistor Rc connected across the motor armature Na. Another voltage-dividing resistor Rp is connected across the constant-voltage terminals Ap and An and has a tapped-off portion series-connected with coils S1 and S3. Resistor Rp provides a bucking voltage so that the resultant signal voltage applied to the pilot field coils S1 and S3 corresponds to the differential value of the voltage from resistor Rc and the bucking voltage from resistor Rp. This differential value may change its polarity depending upon whether the motor terminal voltage is above or below the correct value. It will also be understood that the magnitude of the resultant signal voltage may be extremely small; as a matter of fact this voltage is zero when the motor terminal voltage has the proper value.

The field coils R1 to R4 serve to compensate for the IR drop in the armature circuit of main generator and motor. To this end the "IR-drop" coils R1 to R4 are connected across the series field windings Gs of generator G in series with a calibrating resistor Rr. The voltage drop across field windings Gs is proportional to the load current and hence a measure of the IR drop in the motor armature circuit.

For the purpose of explanation, let us first assume that the three externally excited groups of control field coils receive no excitation. Then the two internal brush circuits would remain dead, the various forcing coils disposed in these two circuits receive no excitation and the output voltage of the machine is zero. Let us now assume that only the pattern field coils T1 to T4 are excited. Then these four field coils would induce a balanced magnetic flux in the field and armature, and the generator R would behave as if it were an ordinary four-pole generator. That is, there still would be no field excitation from the internally excited field coils, and the output voltage of the machine would be determined only by the selected field strength of the pattern field coils. This excitation is imposed on the field Gf of the main generator, and generator G operates to impose a correspondingly output voltage on the motor armature Ma so that the motor will run at a speed determined by the setting of the rheostat Rt. Assuming now that the IR-drop coils R1 to R4 are energized, then the flux produced by these coils modifies the balanced four-pole flux produced by the pattern field coils. As a result, a regulating component is added which tends to maintain the motor speed more accurately at the desired value. The amplifying dynamo under the last assumed conditions would still receive no field excitation from the coils in the internal brush circuits and would act substantially like conventional control generators.

Let us now consider the changes that occur when the signal or pilot fields are also put in operation. As long as the motor, under control by the pattern field coils and IR-drop field coils, runs at the desired speed, the voltage across the tapped-off portion of resistor Rc is balanced by the bucking voltage from resistor Rp so that the signal field coils S1 and S3 receive no excitation. A slight change in speed, however, has the effect of producing a change in voltage across the motor armature and across the tapped-off portion of resistor Rc. As a result, the signal coils S1 and S3 receive excitation and immediately produce circulating currents in the field circuits of the second and third amplifying stage, and a greatly magnified forcing effect is immediately produced by the balanced four-pole flux of the forcing coils C1 to C4 and D1 to D4. This four-pole flux in the input circuit of the last stage is superimposed on the above-mentioned four-pole flux due to the pattern field coils and IR-drop field coils. As a result, the output voltage is changed to restore the desired speed conditions and, due to the high degree of amplification and the extremely low time constant involved in the performance, the regulating function is of a correspondingly high degree of accuracy and speed.

It will be recognized from the foregoing that in a dynamo according to the present invention the performance of the machine, such as the amplified output voltage, is dependent upon resultant control effects which are produced by a plurality of externally energizable field coils and which occur in the input circuits of the first stage and third stage respectively. It will also be recognized that in the system according to Fig. 2 the invention is used for making a minute change in control intelligence effective in comparison with a variable or adjustable control voltage of a higher order of magnitude. That is, the adjustable and hence relatively slow changes to be imposed on the performance of the amplifying dynamo are introduced in a higher stage of amplification than those changes that may occur more rapidly and are intended to be compensated or eliminated at a high speed of response. Consequently, by a proper selection of the machine stages to which the externally energized control coils are applied, the invention facilitates also a comparison or joint operation between phenomena that are to affect the control or regulating performance at different rates of change.

The control performance of the amplifying dynamo in the above described control system of Fig. 2 happens to be of such nature that the field excitation of the signal or pilot field coils S1 and S3 acts at times differentially with respect to the control excitation provided by the other control field coils, in particular the pattern field coils T1 to T4, without ever balancing the effect of the pattern field coils. However, it is also possible according to our invention to apply the control field coils in different amplifying stages in such a manner that one or several control coils in one stage act differentially relative to one or more control coils in another amplifying stage so that the resultant control effect is zero when the machine performance. such as the controlled output voltage of a multistage generator, has the desired value. A generator of this kind is illustrated in Fig. 3.

The generator according to Fig. 3 is a four-pole machine for triple-stage amplification whose externally excited forcing field coils F2, F4, G2, G4, C1 to C4 and D1 to D4 are arranged and operative in the same manner as the corresponding forcing field coils of the dynamo previously described. The generator according to Fig. 3 is equipped with two externally energizable field windings or groups of coils which are denoted by S1, S3 and T2, T4, respectively. The coils S1 and S3 are arranged on field poles P1 and P3, respectively, and connected to input terminals Ts for the application of a variable signal voltage of low magnitude. Coils S1 and S3 operate to produce a circulating current between brushes B1 and B3 for exciting the intermediate forcing coils F2, F4, G2, G4 in the manner described previously. In contrast to the preceding embodiment, the control coils T2 and T4, which may be compared with the correspondingly denoted pattern field coils of the foregoing example are disposed on field poles P2 and P4, respectively, and operate to produce a circulating current between brushes B2 and B4. That is, the coils T2 and T4 according to Fig. 3 magnetize the field structure of the amplifying generator in the axis P2—P4 which extends at a right angle to the field axis of the signal coils S1 and S3. Consequently, the magnetizing effect of windings T2 and T4 is superimposed on that of the intermediate forcing coils C2, C4, D2, D4. It will be recognized that the control coils T2 and T4 are associated with the input excitation of the second amplifying stage so as to impose a variation on the equalizing voltage which appears across the brushes B1 and B3 and is applied to the forcing coils C1 to C4 and D1 to D4 of the third amplifying stage. The terminals Tt of pattern field coils T2 and T4 are to be impressed by an adjustable or variable control voltage of a higher order of magnitude than the signal voltage across terminals Ts.

The arrows shown in Fig. 3 adjacent to the two groups of control windings indicate that the two groups of coils act differentially relative to their effects on the output voltage of the machine. It will be understood that since the field fluxes produced by the two groups of control windings occur in different axes of the field pole structure, the two field groups have separate though magnetically superimposed effects and that when referring to a differential and balanceable action it is not meant to say that the two respective fluxes cancel each other but merely that the ultimate effect of the two control coil groups on the amplified output voltage across terminal To is as if the two control coil groups were acting differentially. The two coil groups in their respective excitation are so rated that the above-mentioned differential effect on the output voltage becomes zero when the two control voltages have a given ratio, for instance, of 1:100. When this balance condition obtains, the output voltage of the amplifying dynamo is zero if no field excitation is applied other than that due to the two control coil groups.

While for many applications the occurrence of zero voltage under balanced control excitation is desirable, there are other applications in which the generator is required to maintain a given or selected output voltage under balance conditions of the control voltages. It is then necessary to provide the machine with some other means of supplying a normally constant field excitation corresponding to the desired normal output voltage. Such an additional field excitation may be obtained by self-energization. According to Fig. 3, for instance, self-energization shunt field windings H1, H2, H3 and H4 are connected across the output terminals To in series with a calibrating resistor Hr. These shunt field coils have equal turns and are arranged on the four field poles, respectively. The resistance of the shunt field circuit can be tuned, by means of the resistor Hr, so that its resistance line is approximately coincident with the unsaturated and substantially linear portion of the no-load magnetization characteristic or air gap line of the dynamo. Such tuning has the effect that the self-energization of the generator provides substantially the entire magnetic flux needed for sustaining the amplified output voltage at any point along the linear operating characteristic. The two mutually balanceable control field circuits then provide merely the energy required to shift the operating point upward or downward along the characteristic and to provide the machine, which would otherwise be unstable, with the necessary voltage stability.

A similar control performance can be obtained by means of self-energizing series fields or compound connected fields. Self-energization in the nature of a series field can also be obtained by giving the main forcing coils C1, C2, C3, C4 a number of turns different from that of the main forcing coils D1, D2, D3, D4. The difference in the number of turns, then effective on all four poles of the machine, has the effect that each pair of main forcing coils, such as the pair C1 and D1, is no longer balanced relative to the load current and provides a series type self-energization in response to the load current or in proportion to the output voltage of the machine. This is explained more in detail in the above-mentioned copending application, Serial No. 685,109. It will be recognized from Fig. 3 that when the last-mentioned way of providing self-energization is applied to the illustrated dynamo, the machine operates in fact with self-excitation by compound fields.

While only two control field windings or groups of windings are shown in Fig. 3 in the first stage and intermediate stage of a triple amplifier, it will be understood from a comparison with the embodiment shown in Figs. 1 and 2 that, if desired, the third stage may be equipped with an externally energizable control field, either instead of the pattern field coils shown in Fig. 3 or in addition to such pattern fields.

The embodiment illustrated in Fig. 4 is in substance similar to the one discussed with reference to Figs. 1 and 2 except that the illustrated dynamo is designed as a double-stage amplifier. According to Fig. 4, two differential signal coils S1 and S3, energized from terminals Ts by variable signal voltage of low magnitude, are arranged only on poles P1 and P3 of the dynamo field structure. Coils S1 and S3 operate as in the preceding examples to impart north polarity to one of the two poles and south polarity to the other pole. As a result, a corresponding equalizing or unbalance voltage appears across the brushes B1 and B3. This unbalance voltage is applied to forcing field windings C1 to C4 and D1 to D4 which are magnetically associated with all four poles in the same manner as the correspondingly denoted main forcing coils according to Figs. 1 to 3. As a result of the balanced four-pole field excitation of the just-mentioned second amplifying stage, a voltage is impressed between the brush pair B1—B3 and the brush pair B2—B4, and this voltage is applied to the output terminals To. A double-stage amplifier according to Fig. 4 requires an internal cross circuit between brushes B2 and B4. This circuit is not equipped with forcing field coils. The undesirable armature reaction, which the circuit B2—B4 tends to impress on the field structure has such a direction that it would weaken the control flux of signal coils S1 and S3. This armature reaction, however, is reduced or virtually eliminated by opposition coils K2 and K4 located in the pole axis P2—P4, and by compensating coils M1 and M3 in the pole axis P1—P3. As mentioned above, the design and function of such opposition and compensating coils is fully explained in the above-mentioned copending application, Serial No. 607,440 so that no further explanation is necessary, especially in view of the fact that such auxiliary coils do not represent a novel feature of the present invention proper.

As also shown in Fig. 4, the double-stage amplifier is equipped with a second group of control field coils which are denoted by T1, T2, T3, T4. These coils have equal turns and are disposed on the four respective poles of the field structure. Hence, their function and arrangement is similar to the pattern field coils according to Figs. 1 and 2.

The dynamo according to Fig. 4 may be used in systems otherwise similar to that of Fig. 2, so that the functions of the pattern field coils and signal or pilot field coils of the dynamo according to Fig. 4 are substantially the same as those described in the foregoing with reference to Fig. 2. However, it is also possible to make the two control field windings and two stages of the amplifiers differential and balanceable relative to each other, as is indicated in Fig. 3 by the opposing arrows shown next to the signal coils and pattern field coils, respectively. The machine can then be used for purposes as referred to above in conjunction with Fig. 3.

Reverting to the control system shown in Fig. 2, it will be remembered that the amplifying generator as shown in Fig. 2 is controlled by three variable control voltages extraneously applied to the respective terminals Tt, Tr and Ts. We have found that when, as in the just-mentioned example, more than two variable control voltages are to be dealt with, it is often possible to combine two or several of these voltages within circuits extraneous to the amplifying generator, and to apply only the resultant effect of these combined voltages to the generator control fields. As a result, it is possible in many cases, to achieve the advantages of our invention with the aid of only two control windings or two groups of coils disposed in two different amplifying stages of the dynamo. Examples of such kind are illustrated in Figs. 5 and 6 and will be described presently.

The Ward-Leonard type system according to Fig. 5 serves to regulate the voltage fed by a main generator G to a motor M so that the motor is regulated to maintain its speed at a value determined by a speed-control rheostat Rt. The motor is shown to have a separately excited field winding Mf energized from constant voltage terminals A through a rheostat Rm. The generator G has an interpole or compensating field winding Gs connected in series with its armature Ga. The main field winding Gf of generator G receives excitation from an amplifying plural-stage generator R. Generator R is shown in Fig. 5 only by a simplified and symbolic representation and may be designed in accordance with any of the embodiments and modifications described in the foregoing with reference to Figs. 1 through 4. The output voltage of generator R is controlled by signal field coils which as a whole are denoted by S, and also by pattern field coils denoted as a whole by T. The signal coils S are magnetically associated with only two oppositely located poles of the four-pole dynamo, while the pattern coils T are associated with all four poles.

Two voltage dividing resistors Rd and Re are connected in series with each other across the motor armature Ma. The signal coils S are connected across the resistor Re and hence are excited by a voltage proportional to the voltage drop across the motor armature.

The pattern field coils T are connected in a closed circuit which includes two series-connected rheostats Rf and Rg. These two rheostats operate as two respective sources of control voltage. The rheostat Rf is connected across the constant voltage terminals A in series with the speed control rheostat Rt. Consequently, the voltage drop impressed on the pattern field circuit by rheostat Rf depends upon the selected adjustment of the rheostat Rt. The rheostat Rg is connected across the series field winding Gs of the generator Ga and hence is impressed by a voltage drop proportional to the IR drop in the main armature circuit. The two voltage drops across rheostats Rf and Rg are cumulative so that the resultant field excitation of the pattern field coils T represent the sum of these two voltages.

The performance of the system is similar to that of Fig. 2, except that the two control effects, originating from the selected adjustment of the speed control rheostat and from the IR drop in the main armature circuit, are electrically superimposed on a single control field circuit of the amplifying generator instead of being magnetically superimposed upon each other as is the case in the system of Fig. 2.

The system according to Fig. 6 is similar to that of Fig. 5, with the exception of the following details. A motor M is shown to be equipped with a series-field winding Ms, for instance an interpole or compensating winding. The circuit of the pattern field coils T receives excitation only from the constant-voltage terminals A, and the connection of the signal field coils S with the main armature circuit is modified so that it represents a circuit of the Wheatstone bridge type. The nature of this bridge circuit is more clearly apparent from the separate illustration given in Fig. 7.

The resistance magnitudes of resistors Rd and Re are chosen to satisfy the equation:

$$\frac{Re}{R1} = \frac{Rd}{R2}$$

wherein R1 represents the resistance of the motor armature Ma, and R2 the total resistance of the two series field windings Gs and Gm. With such a rating, the bridge diagonal voltage across the signal field coils S is proportional to the counter-electromotive force of the motor armature Ma and hence proportional to the motor speed. It will be recognized that in the bridge circuit, the signal voltage is a resultant of the motor terminal voltage and the IR drop voltage measured across the field windings Gs and Ms. Consequently, the circuit of the signal coils S in the system of Fig. 6 combines the function of the IR drop field circuit and signal field circuit of the system according to Fig. 2. The system operates otherwise as described previously.

We are aware of the fact that amplifying plural-stage dynamos according to our invention can be realized by many embodiments other than those specifically illustrated and described in this disclosure without departing from the principles and essential features of the invention. It will be obvious, for instance that although the foregoing description refers mainly to examples of four-pole machines, the invention can similarly be applied to machines of a different number of poles, for instance, to any of the multi-pole generators according to the above-mentioned applications Serial No. 607,440 and Serial No. 682,188. It will also be apparent to those skilled in the art that while we have shown the internal machine circuits to be equipped with forcing coils in order to achieve the input excitation of the last and intermediate amplifying stages, it is also possible, without departure from our invention, to provide a forcing field in one or several intermediate stages of the machine by means of armature reaction excitation, as will be recognized from the disclosure in the copending application, Serial No. 682,188. As a matter of fact, the various modifications and improvements referred to in the above-mentioned four copending applications are all applicable in conjunction with the plural-stage control features according to the present invention.

We claim as our invention:

1. An amplifying dynamo comprising a field structure with four symmetrically arranged poles, a four-pole armature having a commutator with four brushes correlated to said respective poles, a first amplifying stage including externally energizable first control field coils associated with said field structure for magnetizing two opposite ones of said poles with opposing magnetic polarities to produce a voltage difference between the appertaining two brushes, a second amplifying stage including field coils associated with said field structure for magnetizing the other two opposite poles with opposing polarities to produce a second voltage difference between said other two brushes, a third amplifying stage including forcing coils disposed on all four poles and connected across said other two brushes to produce symmetrical four pole main field excitation in order to provide an output voltage between said first two brushes on the one hand and said second two brushes on the other hand, and externally energizable second control field coils associated with the coils of one of said second and third stages so that said output voltage depends on the resultant effect of said first and second control field coils.

2. An amplifying dynamo, comprising a field structure with four symmetrically arranged poles, a four-pole armature having a commutator with four brushes correlated to said respective poles, externally energizable first control coils magnetically associated with two opposite ones of said poles to produce a voltage difference between the appertaining two brushes, field exciting means connected across said two brushes and magnetically associated with said other two poles to produce an amplified voltage difference between said two other brushes, externally energizable second control coils magnetically associated with said other two poles for superimposing a controlled variation on said amplified voltage difference so that the latter depends upon the energization of said first and second control coils, and forcing coils connected across said two other brushes and disposed on all four poles for providing main field excitation of substantially symmetrical flux distribution to produce an output voltage between said pairs of brushes.

3. An amplifying commutating dynamo, comprising a plurality of cascade-connected amplifying stages each including field exciting means and a group of commutator brushes electromagnetically correlated to said respective field exciting means, said field exciting means of one stage including control field means electrically insulated from said brushes and having externally accessible terminals for applying a separate excitation thereto, and said field exciting means of another stage including another control field means electrically insulated from said brushes and having externally accessible terminals for applying separate excitation thereto so that the performance of the dynamo depends upon the resultant effect of said control field means in said different amplifying stages.

4. An amplifying commutating dynamo, comprising a plurality of cascade-connected amplifying stages each including field exciting means and a group of commutator brushes electromagnetically correlated to said respective field exciting means, said field exciting means of one stage including first control field means insulated from said brushes, said field exciting means of another stage including second control field means insulated from said brushes, first direct-current supply means of variable voltage connected to said first control field means to provide excitation therefor, and second direct-current supply means of variable voltage connected to said second control field means to provide excitation therefor, said two supply means being poled relative to each other so that said first and second control field means oppose each other as regards their respective effects on the control performance of the dynamo, and said first and second control field means being balanceable relative to each other as regards said performance.

5. An amplifying commutating dynamo, comprising a magnetic multi-pole field structure, an armature having a commutator with a plurality of groups of brushes, forcing field coils connected across one of said brush groups and disposed on said field structure to provide substantially balanced main field excitation, terminals connected to another group of said brushes to provide output voltages under control by said main field excitation, externally energizable first control windings electrically insulated from said brushes and disposed on said field structure to provide unbalanced control excitation, said first control windings being electromagnetically correlated to said one group of brushes for controlling said main field excitation, and externally energizable second control windings insulated from said brushes and disposed on said field structure for varying the magnitude of said balanced main excitation.

6. An amplifying plural-stage generator, comprising a multi-pole field structure, an armature with a commutator having a plurality of groups of brushes, an input stage including externally energizable control field coils insulated from said brushes and disposed on said structure for causing an internal circulating current to flow between the brushes of one of said groups, an output stage including forcing field coils of balanced flux distribution disposed on said structure, circuit means connected to the brushes of said one group for controlling said forcing field coils by said internal circulating current, externally energizable control field coils of balanced flux distribution disposed on said structure, and output terminals connected to another one of said brush groups to provide output voltages under control by the resultant field excitation caused by said forcing coils and said control field coils.

7. An amplifying triple-stage generator, comprising a multi-polar field structure, an armature having a commutator with two groups of brushes, an input stage including externally energizable control field coils disposed on said structure and electromagnetically correlated to one of said brush groups to cause circulating current to flow between the brushes of said one group, an intermediate stage including forcing field means connected across said brushes of said first group and electromagnetically correlated to said second brush group to cause another circulating current to flow between the brushes of said second group, an output stage including forcing field coils of balanced flux distribution connected across said brushes of said second group and disposed on said structure to provide a main field for producing an output voltage between said two groups of brushes, and externally energizable control field coils associated with said forcing means of said intermediate stage for imposing a variable control effect on said other circulating current.

8. An amplifying triple-stage generator, comprising a multi-polar field structure, an armature having a commutator with two groups of brushes, an input stage including externally energizable control field coils disposed on said structure and inductively correlated to a first one of said brush groups for causing a controlled circulating current to flow between the brushes of said first group, an intermediate stage including forcing means disposed on said structure and connected across said brushes of said first group and inductively correlated with said second brush group for causing another controlled circulating current to flow between the brushes of said second group, an output stage including forcing field coils disposed on said structure for substantially balanced flux distribution and connected across said brushes of said second group for providing a main field to produce an output voltage between said two groups of brushes, and externally energizable control field coils of substantially balanced flux distribution disposed on said structure and associated with said forcing field coils of said output stage for imposing a controllable variation of said main field.

9. An amplifying dynamo, comprising a field structure with four symmetrically arranged poles, a four-pole armature having a commutator with four brushes correlated to said respective poles, externally energizable first control field coils associated with said field structure and poled for magnetizing the opposite ones of said poles with opposing magnetic polarities to produce a voltage difference between the appertaining two brushes, forcing field coils disposed on said structure and poled relative to said respective poles for symmetrically magnetizing said four poles with alternately different polarities, said forcing field coils being connected across said two other brushes to be energized in dependence upon said voltage difference, second control field coils insulated from said brushes and associated with said forcing field coils for varying the symmetrical magnetization of said four poles, and output leads connected to said two brushes on the one hand and to said remaining two brushes on the other hand for providing an output voltage dependent upon the resultant control effect of said first and second control field coils.

10. An amplifying plural-stage dynamo as set forth in claim 3, comprising a multi-pole field structure with different magnetization axes, one of said control field means being inductively associated with said structure and having a flux axis coincident with only one of said magnetization axes, and said other control field means being inductively associated with said structure and having a flux axis coincident with another one of said magnetization axes.

GEORGE E. KING.
MARTIN H. FISHER.

REFERENCES CITED

The following references are of record in the file of this patent:

UNITED STATES PATENTS

| Number | Name | Date |
|---|---|---|
| 2,238,811 | Crever | Apr. 15, 1941 |
| 2,301,688 | Edwards | Nov. 10, 1942 |